US011150066B2

United States Patent
Himmelmann (10) Patent No.: US 11,150,066 B2
(45) Date of Patent: Oct. 19, 2021

(54) MULTI-USE TORPEDO PROPULSION SYSTEM STARTER

(71) Applicant: Hamilton Sundstrand Corporation, Charlotte, NC (US)

(72) Inventor: Richard A. Himmelmann, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 384 days.

(21) Appl. No.: 16/409,474

(22) Filed: May 10, 2019

(65) Prior Publication Data

US 2020/0355480 A1    Nov. 12, 2020

(51) Int. Cl.
| | |
|---|---|
| F42B 19/22 | (2006.01) |
| F42B 19/24 | (2006.01) |
| H02K 5/02 | (2006.01) |
| H02K 5/00 | (2006.01) |
| F01N 3/20 | (2006.01) |

(52) U.S. Cl.
CPC ............. *F42B 19/22* (2013.01); *F01N 3/204* (2013.01); *F42B 19/24* (2013.01); *H02K 5/02* (2013.01); *H02K 5/00* (2013.01)

(58) Field of Classification Search
CPC ........... F42B 19/22; F42B 19/24; H02K 5/00; H02K 5/02; F01N 3/204
USPC .............................. 114/20.2; 60/218; 89/1.81
See application file for complete search history.

(56) References Cited

U.S. PATENT DOCUMENTS

| | | | | |
|---|---|---|---|---|
| 2,700,356 A | * | 1/1955 | Arthur | F42B 19/30 114/20.1 |
| 2,938,482 A | | 5/1960 | Newburn et al. | |
| 2,975,746 A | | 3/1961 | Corbett | |
| 3,402,639 A | * | 9/1968 | Beteille | F42B 15/20 89/1.809 |
| 3,499,364 A | * | 3/1970 | Ooge | F41F 3/07 89/1.81 |

(Continued)

FOREIGN PATENT DOCUMENTS

| | | |
|---|---|---|
| EP | 1477663 A2 | 11/2004 |
| EP | 2813683 B1 | 12/2014 |

(Continued)

OTHER PUBLICATIONS

Partial European Search Report; Application No. 19212099.6; dated Jun. 26, 2020; 13 pages.

(Continued)

*Primary Examiner* — Pedro J Cuevas
(74) *Attorney, Agent, or Firm* — Cantor Colburn LLP (57) ABSTRACT

Disclosed is a hybrid electric torpedo that includes an igniter having a resistance, a current source, and a contactor. The torpedo includes a controller having input channels operable to receive a battery state of charge and the resistance and output channels configured to operate the contactor to control the current source of the igniter. The controller includes stored memory instructions operable upon execution to operate the contactor to conduct current through the igniter such that a temperature of the igniter increases. The contactor is operated responsive to the battery state of charge being less than a predetermined state of charge threshold and the resistance being less than a predetermined open circuit threshold.

19 Claims, 7 Drawing Sheets

(56) References Cited

U.S. PATENT DOCUMENTS

| | | | | |
|---|---|---|---|---|
| 3,714,783 | A * | 2/1973 | Bennett, Jr. | F02K 9/72 60/207 |
| 4,161,104 | A * | 7/1979 | Ladacki | C06B 47/08 149/36 |
| 5,346,473 | A | 9/1994 | Bowman | |
| 5,542,333 | A * | 8/1996 | Hagelberg | F41F 3/07 220/378 |
| 5,608,179 | A * | 3/1997 | Voecks | F41A 1/04 89/7 |
| 5,763,821 | A * | 6/1998 | Wheatley | C06B 29/06 149/19.5 |
| 5,918,307 | A * | 6/1999 | Cipolla | F41F 3/07 89/1.81 |
| 6,418,870 | B1 * | 7/2002 | Lanowy | F41F 3/10 114/238 |
| 6,505,463 | B2 * | 1/2003 | Kruse | F02K 9/48 60/218 |
| 6,803,544 | B1 * | 10/2004 | Zikes | F23Q 7/24 219/263 |
| 6,931,832 | B2 * | 8/2005 | Berg | C06B 31/00 60/206 |
| 7,357,093 | B2 * | 4/2008 | Potter | B63G 8/32 114/238 |
| 8,024,918 | B2 * | 9/2011 | Mittendorf | F02K 9/44 60/205 |
| 8,183,501 | B2 * | 5/2012 | Li | F01N 3/204 219/260 |
| 2004/0226280 | A1 * | 11/2004 | Berg | F41A 1/04 60/218 |
| 2009/0151338 | A1 * | 6/2009 | Li | F01N 9/00 60/295 |

FOREIGN PATENT DOCUMENTS

| | | |
|---|---|---|
| EP | 2995555 B1 | 3/2016 |
| EP | 3418674 A1 | 12/2018 |
| GB | 191307302 A | 10/1913 |

OTHER PUBLICATIONS

EP Search Report; Application No. 19212099.6-1011; dated Sep. 29, 2020; 13 pages.

\* cited by examiner

MULTI-USE TORPEDO PROPULSION SYSTEM STARTER

BACKGROUND

Exemplary embodiments pertain to the art of multi-use torpedo propulsion system starters. Starters are used to ignite combustible materials within a combustion chamber associated with a turbine.

BRIEF DESCRIPTION

Disclosed is a hybrid electric torpedo that includes an igniter having a resistance, a current source, and a contactor. The torpedo includes a controller having input channels operable to receive a battery state of charge and the resistance and output channels configured to operate the contactor to control the current source of the igniter. The controller includes stored memory instructions operable upon execution to operate the contactor to conduct current through the igniter such that a temperature of the igniter increases. The contactor is operated responsive to the battery state of charge being less than a predetermined state of charge threshold and the resistance being less than a predetermined open circuit threshold.

In addition to one or more of the features described above, or as an alternative, further embodiments may include a fuel pump and a combustion chamber defining an aperture. In addition to one or more of the features described above, or as an alternative, further embodiments may include that the resistance corresponds to the temperature and the stored memory instructions are further operable upon execution to, responsive to the temperature being greater than a predetermined temperature threshold, operate the fuel pump to convey fuel into the combustion chamber.

In addition to one or more of the features described above, or as an alternative, further embodiments may include that the stored memory instructions are further operable upon execution to operate the fuel pump to convey fuel into the combustion chamber only when a speed of the fuel pump is greater than a predetermined speed threshold.

In addition to one or more of the features described above, or as an alternative, further embodiments may include that the fuel pump is operated by adjusting a wobble angle of the fuel pump.

In addition to one or more of the features described above, or as an alternative, further embodiments may include that the fuel pump is an axial piston engine.

In addition to one or more of the features described above, or as an alternative, further embodiments may include that the igniter includes a housing having terminals configured to receive electrical conductors and a unitary ignition element having ends conductively joined with the terminals and having an ignition element material composition. In addition to one or more of the features described above, or as an alternative, further embodiments may include that the igniter includes an Inconel hermetic coating that encapsulates the unitary ignition element and including an Inconel hermetic seal formed to join the aperture.

In addition to one or more of the features described above, or as an alternative, further embodiments may include that the unitary ignition element is sized to enter the aperture.

Also disclosed is a hybrid electric torpedo that includes a combustion chamber defining an aperture and an igniter having a resistance, a current source, and a contactor. The igniter includes a housing having terminals configured to receive electrical conductors and a unitary ignition element having ends conductively joined with the terminals and having an ignition element material composition, the igniter including an Inconel hermetic coating that encapsulates the unitary ignition element and including an Inconel hermetic seal formed to join the aperture.

In addition to one or more of the features described above, or as an alternative, further embodiments may include that the unitary ignition element is sized to enter the aperture.

In addition to one or more of the features described above, or as an alternative, further embodiments may include a fuel pump having an associated with an inlet of the combustion chamber.

In addition to one or more of the features described above, or as an alternative, further embodiments may include that the ignition element material composition is ceramic.

In addition to one or more of the features described above, or as an alternative, further embodiments may include that the Inconel hermetic coating and the Inconel hermetic seal are unitary.

In addition to one or more of the features described above, or as an alternative, further embodiments may include a controller having input channels operable to receive a battery state of charge and the resistance and output channels configured to operate the contactor to control the current source of the igniter, the controller having stored memory instructions operable upon execution to, responsive to the battery state of charge being less than a predetermined state of charge threshold and the resistance being less than a predetermined open circuit threshold, operate the contactor to conduct current through the igniter such that a temperature of the igniter increases.

In addition to one or more of the features described above, or as an alternative, further embodiments may include a fuel pump having an outlet associated with an inlet of the combustion chamber.

In addition to one or more of the features described above, or as an alternative, further embodiments may include that the resistance corresponds to the temperature and the stored memory instructions are further operable upon execution to, responsive to the temperature being greater than a predetermined temperature threshold, operate the fuel pump to convey fuel into the combustion chamber.

Also disclosed is a method that includes receiving a state of charge of a battery less than a predetermined state of charge threshold during an OFF evolution of a combustion engine of a hybrid electric torpedo propulsion system. The method includes receiving a resistance of an igniter less than a predetermined open circuit threshold. The method includes operating a switch associated with the igniter such that current flows through the igniter and a temperature of the igniter increases.

In addition to one or more of the features described above, or as an alternative, further embodiments may include responsive to the temperature being greater than a predetermined temperature threshold, start a fuel pump configured to convey fuel into a combustion chamber of the combustion engine.

In addition to one or more of the features described above, or as an alternative, further embodiments may include conveying fuel into the combustion chamber responsive to a speed of the fuel pump is greater than a predetermined speed threshold.

In addition to one or more of the features described above, or as an alternative, further embodiments may include that a wobble angle of the fuel pump is adjusted to convey fuel into the combustion chamber.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

A torpedo may include a propulsion system configured to propel the torpedo through a medium such as seawater. The propulsion system may be a hybrid electric torpedo propulsion system. Hybrid electric propulsion systems may allow a turbine or electric machine to propel the torpedo. The turbine may be used to charge an electric battery associated with the electric machine. After the battery has a full state of charge, the turbine is shut down, and the electric machine is used to propel the torpedo. After the battery is depleted or partially depleted, the turbine may be restarted to recharge the battery. A multi-use igniter may be used to reignite the combustion chamber. The igniter may be configured to withstand corrosive environments in the combustion chamber and sealed to prevent leakage of fuel and exhaust gases.

Figure 1:
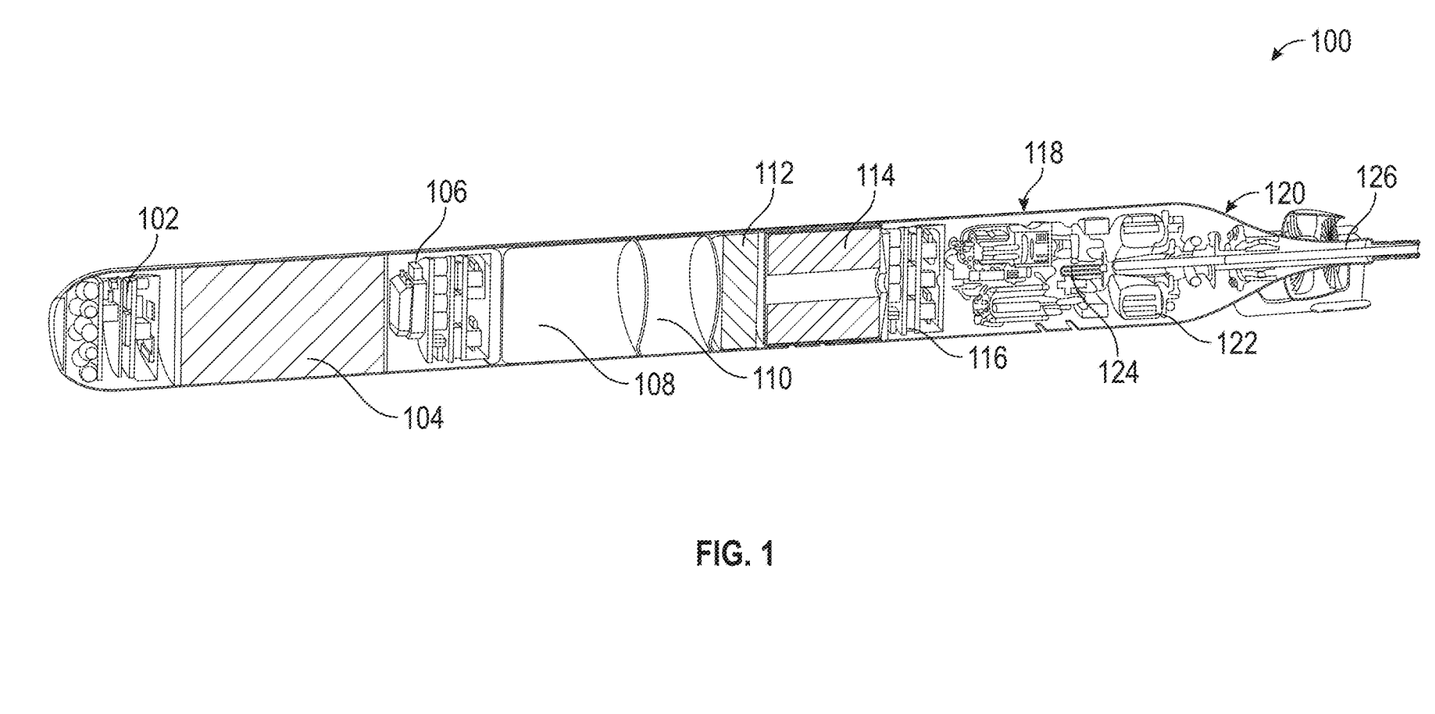
FIG. 1 is a system diagram for a hybrid electric torpedo.

Referring to FIG. 1 a torpedo 100 is shown. The torpedo 100 includes a homing system 102 configured to navigate to targets. The torpedo 100 includes a warhead module 104. The torpedo 100 includes an electronics module 106 for operating the torpedo 100 and the warhead module 104. The torpedo 100 includes fuel 110 and an oxidizer 108. The torpedo 100 may include a guidance wire spool 114. Propulsion electronics 116 operate the hybrid electric propulsion system 118 and may include a controller or plurality of controllers. The controller may include any combination of processors, field programmable gate arrays (FPGA), or application specific integrated circuits (ASIC). The controller may include memory, volatile and non-volatile, operable to store machine instructions from the processors and other processing mechanisms to receive, calculate, and control devices, as necessary. Machine instructions may be stored in any language or representation, including but not limited to machine code, assembly instructions, C, C++, C#, PASCAL, COBAL, PYTHON, JAVA, and RUBY. It should be appreciated that any type of wired or wireless configuration is appreciated for any of the communications from the controller. Wireless protocols such as ZIGBEE, WI-FI, BLUETOOTH, or other implement may be used. Communications may be realized through any protocol or medium known or unknown. The hybrid electric propulsion system 118 includes a propulsion electric machine 122, a turbine 124 and a combustion chamber. The torpedo 100 includes an aft body 120. The aft body 120 included a propulsor and an exhaust conduit 126 attached to the turbine outlet.

Figure 2:
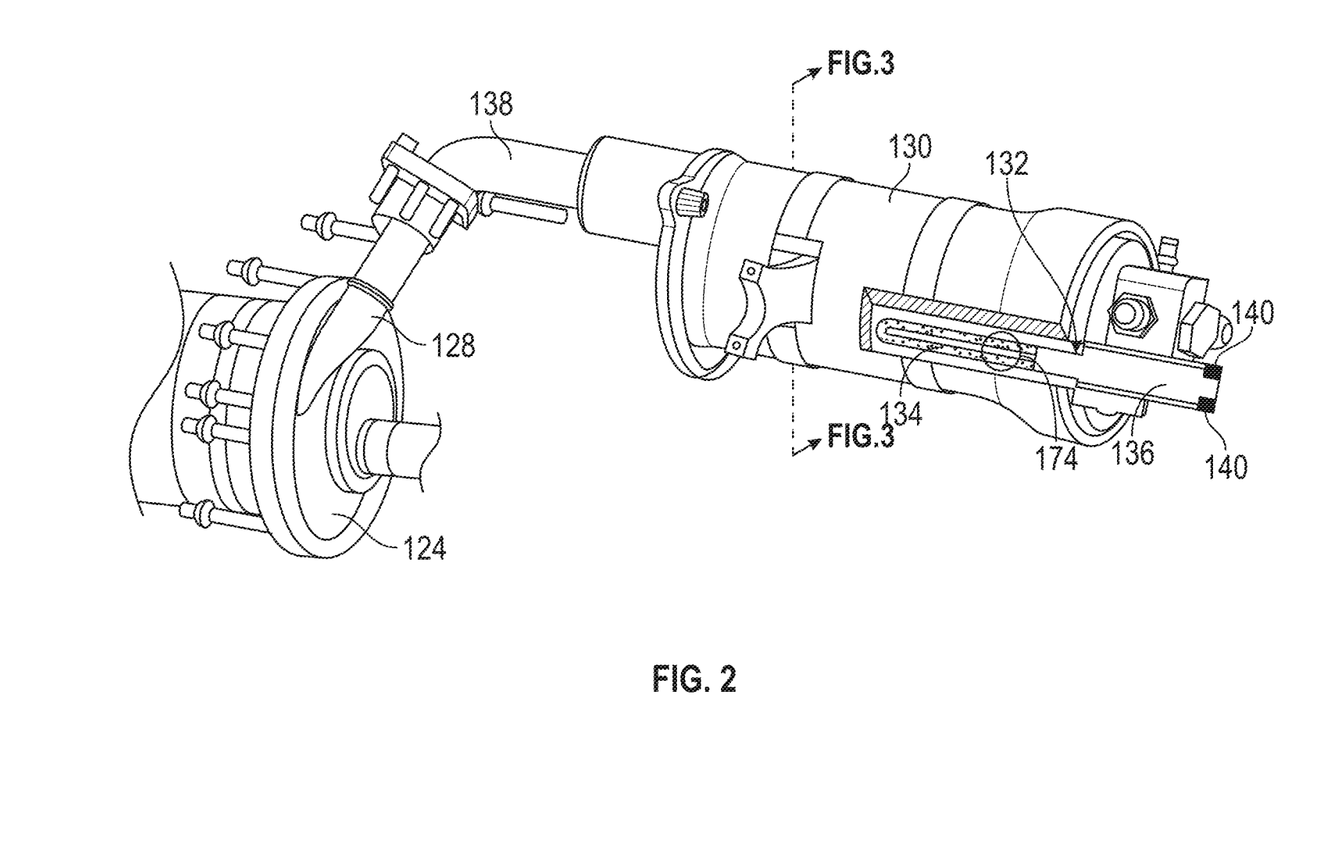
FIG. 2 is a perspective view of a turbine and combustion chamber.
Figure 5:
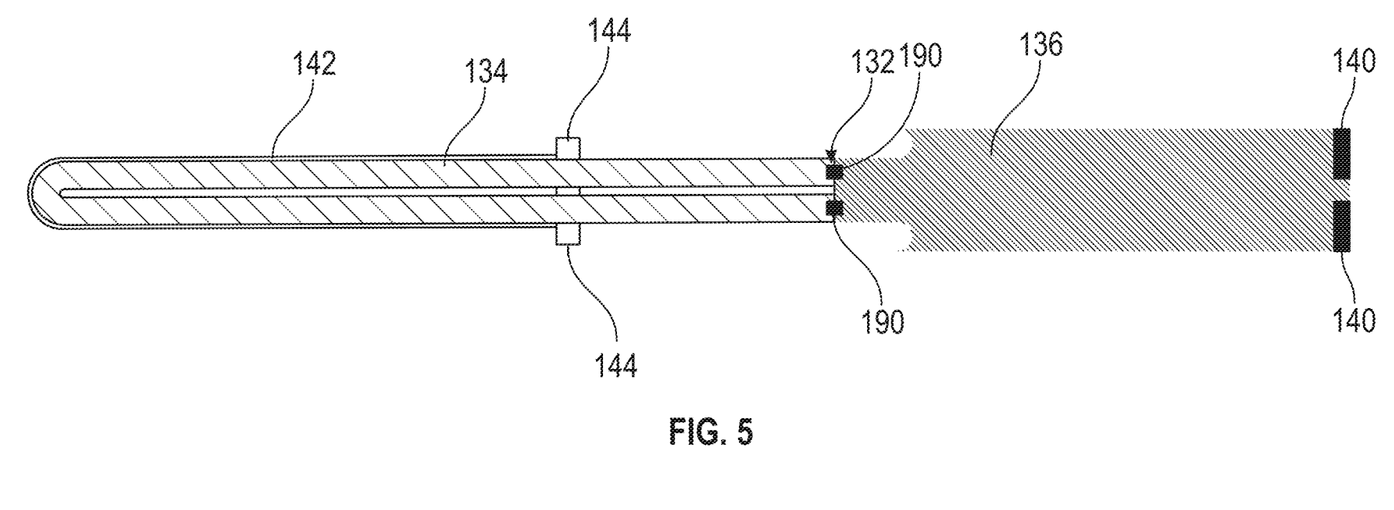
FIG. 5 is a plan view of an igniter associated with a combustion chamber.

Referring to FIG. 2, a closer perspective of the combustion chamber 130 and turbine 124 or combustion engine is shown. The combustion chamber 130 is connected to the turbine through conduit 138. Nozzle 128 releases expanded gases into the turbine 124 causing rotational movement via cooperation of rotary and stationary blades. The combustion chamber 130 includes an igniter 132. The igniter includes an ignition element 134 and a housing 136. The ignition element 134 is a conductive element configured to create a hot surface within the combustion chamber 130. The ignition element 134 may be unitary ignition element. As fuel enters the combustion chamber 130 it is ignited by the ignition element 134. The ignition element 134 may be unitary in that it is a single piece. The ignition element 134 may be fabricated by any means, including extrusion and machining, die casting, additively manufactured or stamping. The ignition element 134 may be made of an ignition element material composition, including combinations of aluminum, carbon, silicon, tungsten, zirconia, and other metals and ceramics (e.g., Tungsten Carbide, Silicon Nitride) or a combination of the above. The ignition element 134 may be electrically connected with a housing 136 at ends 190, as shown in FIG. 5. The housing 136 may include terminals 140 for connecting with conductors associated with a battery 152.

Figure 3:
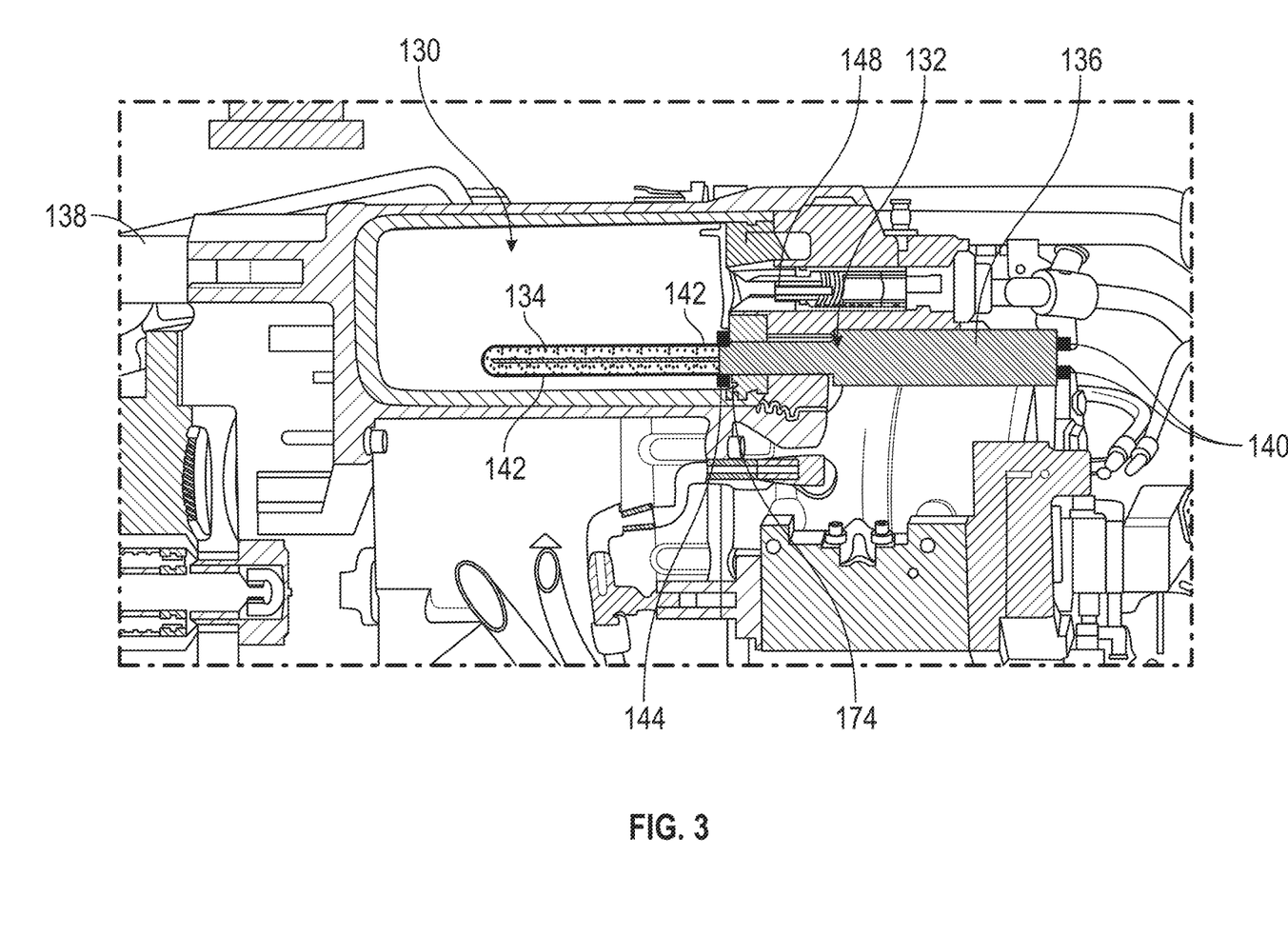
FIG. 3 is a cross-sectional side view of a combustion chamber having an igniter.

Referring to FIG. 3, section A-A of FIG. 2 is shown. The combustion chamber 130 is configured with outlet 138 to the turbine 124 and inlet 148 from a fuel pump. The igniter 132 protrudes through an aperture 174. The igniter 132 includes an ignition element 134 being sized to fit through the aperture 174 for fast assembly. The ignition element 134 may also include different shapes and forms to properly ignite fuel from fuel line 148. The ignition element 134 is coated in a hermetic sealant 142. The hermetic sealant 142 may be a variety of materials, including Inconel and stainless steel. That is, the ignition element 134 may have an Inconel hermetic coating 142. Various alloys of Inconel and stainless steel may be used having varying degrees of Chromium or Nickel. The ignition element 134 may be sealed by seal 144 into the combustion chamber 130. That is, the ignition element 134 may have an Inconel hermetic seal 144. For example, the hermetic sealant 142 may be used to weld or otherwise seal the ignition element 134 into the combustion chamber 130. Glass may be used as a hermitic seal material. That is, the ignition element 134 may be coated partially or fully in a variety of materials including glass, stainless steel, or Inconel. Such materials may be melted to weld the ignition element 134 into the combustion chamber 130 and form seal 144.

Figure 4:
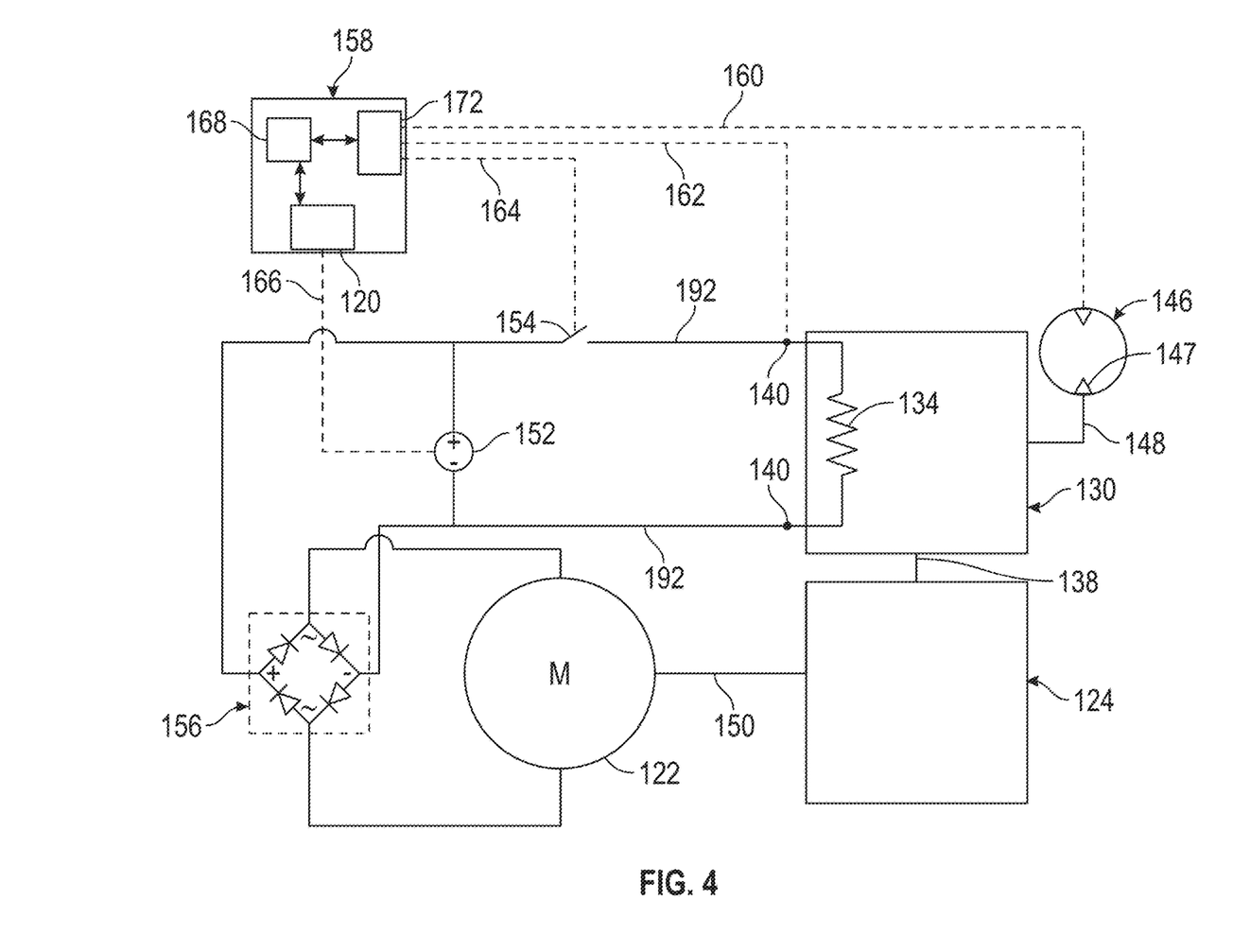
FIG. 4 is a system diagram for a hybrid electric propulsion system of a torpedo.

Referring to FIG. 4 a schematic system diagram is shown. The hybrid propulsion system includes an electric machine 122, a turbine 124, a combustion chamber 130, a fuel pump 146, and a battery 152. A controller 158 is configured to operate the machinery of the torpedo 100. The controller 158 includes input channels 162, 166 for receiving battery voltage or battery state of charge 166, and a voltage drop or resistance 162 of ignition element 134 across terminals 140 the electrical conductors 192 associated with battery 152 are connected to the housing 136 at the terminals 140. The controller 158 includes an output channel 164 to operate a contactor or switch 154. The contactor 154 may be operated to close a circuit between the battery 152 and the ignition element 134. The battery 152 may serve as a current source.

The controller 158 may also include an output channel 160 to operate fuel pump 146. As such, the fuel pump 146 includes outlet 147 that provides combustible material to the combustion chamber 130 via fuel conduit 148. The expanded gases are transferred to turbine 124 through conduit 138 and nozzle 128. The turbine 124 turns output shaft 150 to drive electric current through the stator of electric machine 122. The alternating current is rectified through rectifier 156 to charge battery 152. It should be appreciated that any number of machinery and components may be used to implement any and all of the functions provided. Machinery and components may be added or omitted and operations may be performed in any order.

FIG. 5 shows one aspect of ignition element 134. Ignition element 134 is coated in a hermetic sealant 142. The hermetic sealant 142 may be a variety of materials, including Inconel and stainless steel. Various alloys of Inconel and stainless steel may be used having varying degrees of Chromium or Nickel. The ignition element 134 may be sealed by seal 144 into the combustion chamber 130. For example, the hermetic sealant 142 may be used to weld or otherwise seal the ignition element 134 into the combustion chamber 130. Glass may be used as a hermitic seal material. That is, the ignition element 134 may be coated partially or fully in a variety of materials including glass, stainless steel, or Inconel. Such materials may be melted to weld the ignition element 134 into the combustion chamber 130 and form seal 144.

Figure 6:
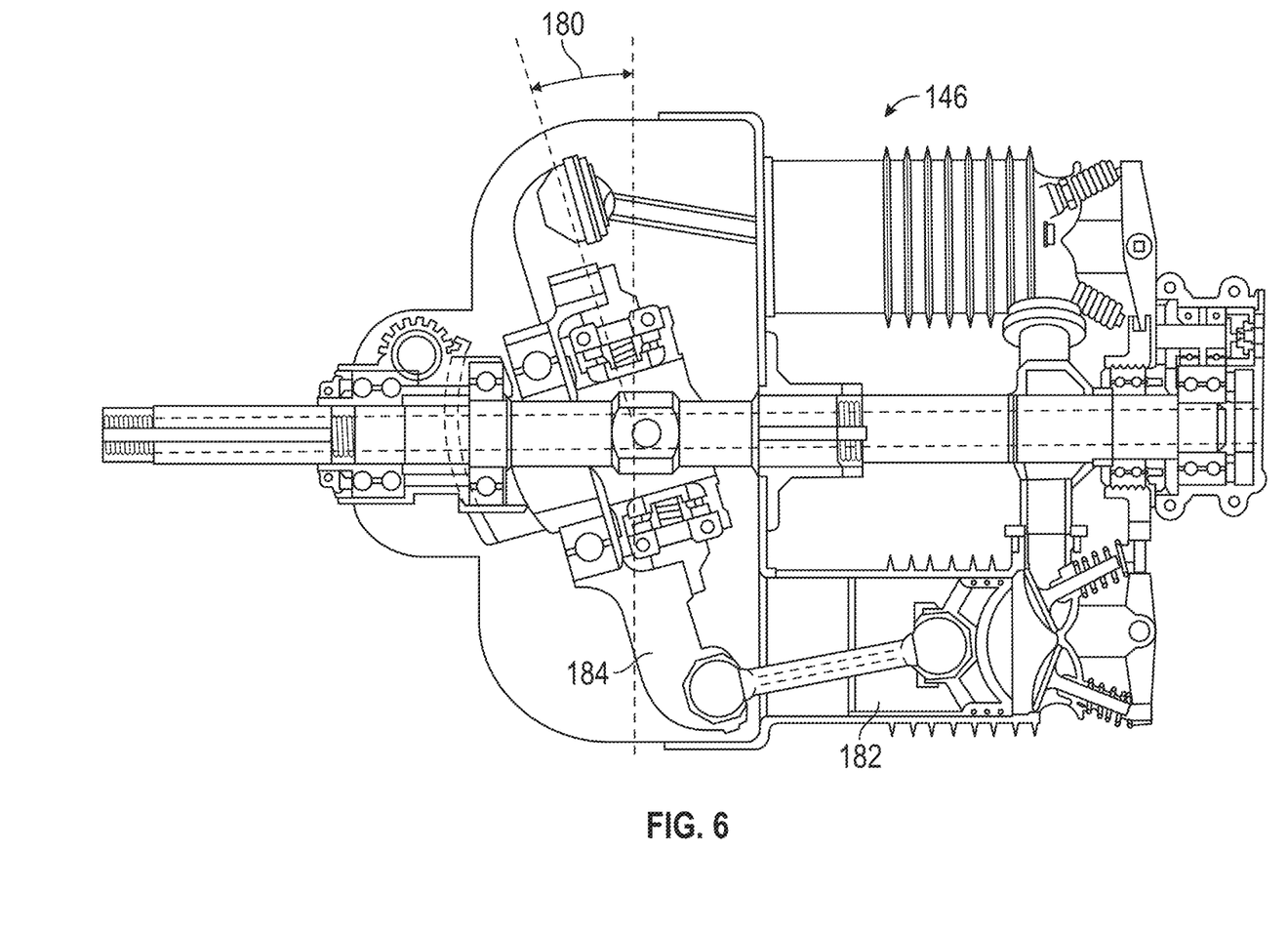
FIG. 6. is a cross-sectional view of an axial fuel pump.

Referring to FIG. 6, a fuel pump 146 is shown. The fuel pump may be an axial piston pump as shown. The fuel pump 146 includes pistons 182 driven according to a wobbler 184. The wobbler 184 has a wobble angle 180. The wobbler 184 engages the pistons 182 at different rates based on the wobble angle 180 to control the flow of fuel entering to the combustion chamber 130.

Figure 7:
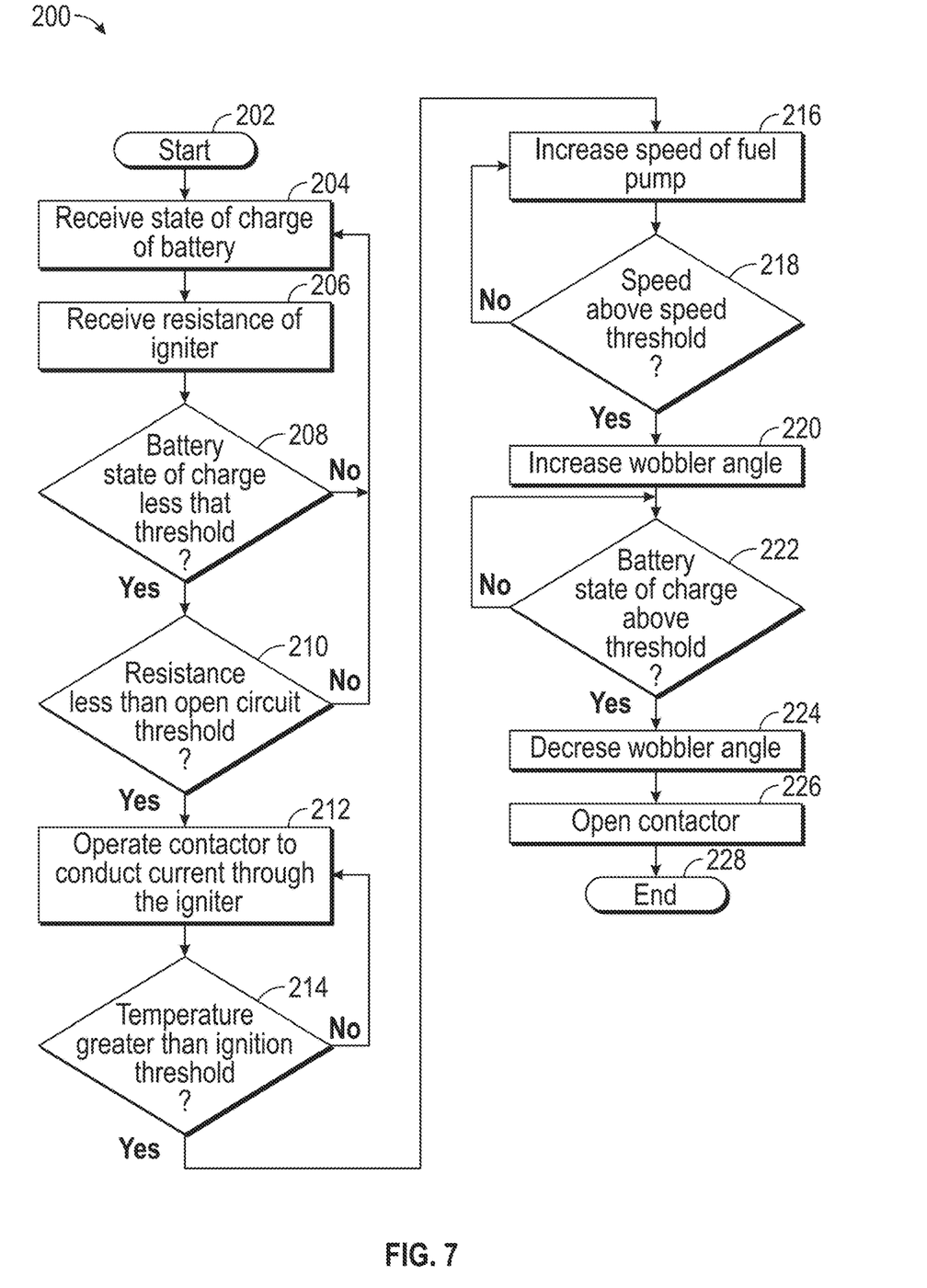
FIG. 7 is a method for operating portions of a hybrid electric torpedo.

FIG. 7 is a method 200 for operating a torpedo propulsion system. The method 200 beings in step 202. The electric propulsion system may start in an OFF condition as part of an OFF evolution where the torpedo is propelled by the electric machine 122 or another electric machine and the turbine 124 is not receiving expanded gas from the combustion chamber 130. In step 202 a state of charge of the battery 152 is received. The state of charge may be calculated by the controller 158 or received from a battery monitoring component. The controller 158 may include a processor 168 or controller having associated memory for storing memory instructions. The processor 168 interfaces with digital and analog inputs and outputs 170, 172 for communicating along channels 160, 162, 164, 166. The state of charge may be calculated from Coloumb counting or another method. The controller 158 may receive a resistance of the ignition element 134 in step 206. The resistance may be determined based on a voltage drop or other measurement associated with the ignition element 134 and battery 152. In step 208, the controller 158 determines whether the battery state of charge received is less than a predetermined state of charge threshold. For example, the state of charge threshold may be 25% of remaining battery capacity. If the state of charge of the battery 152 is less than the state of charge threshold in step 208, the controller determines whether an open circuit across the ignition element 134 is present. For example, if the resistance 162 measured is greater than a predetermined threshold, the ignition element 134 may be considered burned up and inoperable. The predetermined open circuit threshold may be based on an operable temperature band of the ignition element 134 associated with a resistance 162 of the ignition element 134. If the resistance indicates continuity of the ignition element 134, the controller 158 will operate a contactor 154 or relay to conduct current through the igniter 132 in step 212. As the temperature rises, the controller 158 will determine whether the temperature of the ignition element 134 is above a predetermined temperature threshold associated with the fuel provided from the fuel pump 146. If the temperature is greater than the temperature threshold in step 214, the fuel pump 146 is started in step 216. The fuel pump 146 may be any type of fuel conveyor, including an axial fuel pump or axial piston pump. As the speed of the fuel pump 146 increases past a predetermined speed threshold in step 218, the wobble angle 180 of an axial pump is increased to convey the flow of combustible material or fuel 110, 112 in the combustion chamber 130. As the battery state of charge increases based on electricity provided by the electric machine 122, the controller 158 will decrease the wobble angle 180 or turn off the fuel pump 146. After fuel is exhausted from the combustion chamber 130, the controller 158 may open contactor 226 such that the ignition element 134 reduces in temperature and current is not drawn from the battery 152 or another electrical source.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hybrid electric torpedo comprising:
   an igniter having a resistance, a current source, and a contactor; and
   a controller having input channels operable to receive a battery state of charge and the resistance and output channels configured to operate the contactor to control the current source of the igniter, the controller having stored memory instructions operable upon execution to, responsive to the battery state of charge being less than a predetermined state of charge threshold and the resistance being less than a predetermined open circuit threshold, operate the contactor to conduct current through the igniter such that a temperature of the igniter increases.

2. The hybrid electric torpedo of claim 1 further comprising:
   a fuel pump; and
   a combustion chamber defining an aperture;
   wherein the resistance corresponds to the temperature and the stored memory instructions are further operable upon execution to, responsive to the temperature being greater than a predetermined temperature threshold, operate the fuel pump to convey fuel into the combustion chamber.

3. The hybrid electric torpedo of claim 2, wherein the stored memory instructions are further operable upon execution to operate the fuel pump to convey fuel into the combustion chamber only when a speed of the fuel pump is greater than a predetermined speed threshold.

4. The hybrid electric torpedo of claim 3, wherein the fuel pump is operated by adjusting a wobble angle of the fuel pump.

5. The hybrid electric torpedo of claim 4, wherein the fuel pump is an axial piston engine.

6. The hybrid electric torpedo of claim 2, wherein the igniter includes:
   a housing having terminals configured to receive electrical conductors; and
   a unitary ignition element having ends conductively joined with the terminals and having an ignition element material composition,
   wherein the igniter includes an Inconel hermetic coating that encapsulates the unitary ignition element and including an Inconel hermetic seal formed to join the aperture.

7. The hybrid electric torpedo of claim 6, wherein the unitary ignition element is sized to enter the aperture.

8. A hybrid electric torpedo comprising:
   a combustion chamber defining an aperture; and
   an igniter having a resistance, a current source, and a contactor, the igniter includes
      a housing having terminals configured to receive electrical conductors, and
      a unitary ignition element having ends conductively joined with the terminals and having an ignition element material composition, the igniter including an Inconel hermetic coating that encapsulates the unitary ignition element and including an Inconel hermetic seal formed to join the aperture.

9. The hybrid electric torpedo of claim 8, wherein the unitary ignition element is sized to enter the aperture.

10. The hybrid electric torpedo of claim 8 further comprising, a fuel pump having an associated with an inlet of the combustion chamber.

11. The hybrid electric torpedo of claim 8, wherein the ignition element material composition is ceramic.

12. The hybrid electric torpedo of claim 8, wherein the Inconel hermetic coating and the Inconel hermetic seal are unitary.

13. The hybrid electric torpedo of claim 8 further comprising, a controller having input channels operable to receive a battery state of charge and the resistance and output channels configured to operate the contactor to control the current source of the igniter, the controller having stored memory instructions operable upon execution to, responsive to the battery state of charge being less than a predetermined state of charge threshold and the resistance being less than a predetermined open circuit threshold, operate the contactor to conduct current through the igniter such that a temperature of the igniter increases.

14. The hybrid electric torpedo of claim 13 further comprising, a fuel pump having an outlet associated with an inlet of the combustion chamber.

15. The hybrid electric torpedo of claim 14, wherein the resistance corresponds to the temperature and the stored memory instructions are further operable upon execution to, responsive to the temperature being greater than a predetermined temperature threshold, operate the fuel pump to convey fuel into the combustion chamber.

16. A method comprising:
   receiving a state of charge of a battery less than a predetermined state of charge threshold during an OFF evolution of a combustion engine of a hybrid electric torpedo propulsion system;
   receiving a resistance of an igniter less than a predetermined open circuit threshold; and
   operating a switch associated with the igniter such that current flows through the igniter and a temperature of the igniter increases.

17. The method of claim 16 further comprising, responsive to the temperature being greater than a predetermined temperature threshold, start a fuel pump configured to convey fuel into a combustion chamber of the combustion engine.

18. The method of claim 17 further comprising, conveying fuel into the combustion chamber responsive to a speed of the fuel pump is greater than a predetermined speed threshold.

19. The method of claim 18, wherein a wobble angle of the fuel pump is adjusted to convey fuel into the combustion chamber.

\* \* \* \* \*